Sept. 27, 1949.    L. BLOK    2,483,311
FREQUENCY ANALYZER
Filed July 13, 1946
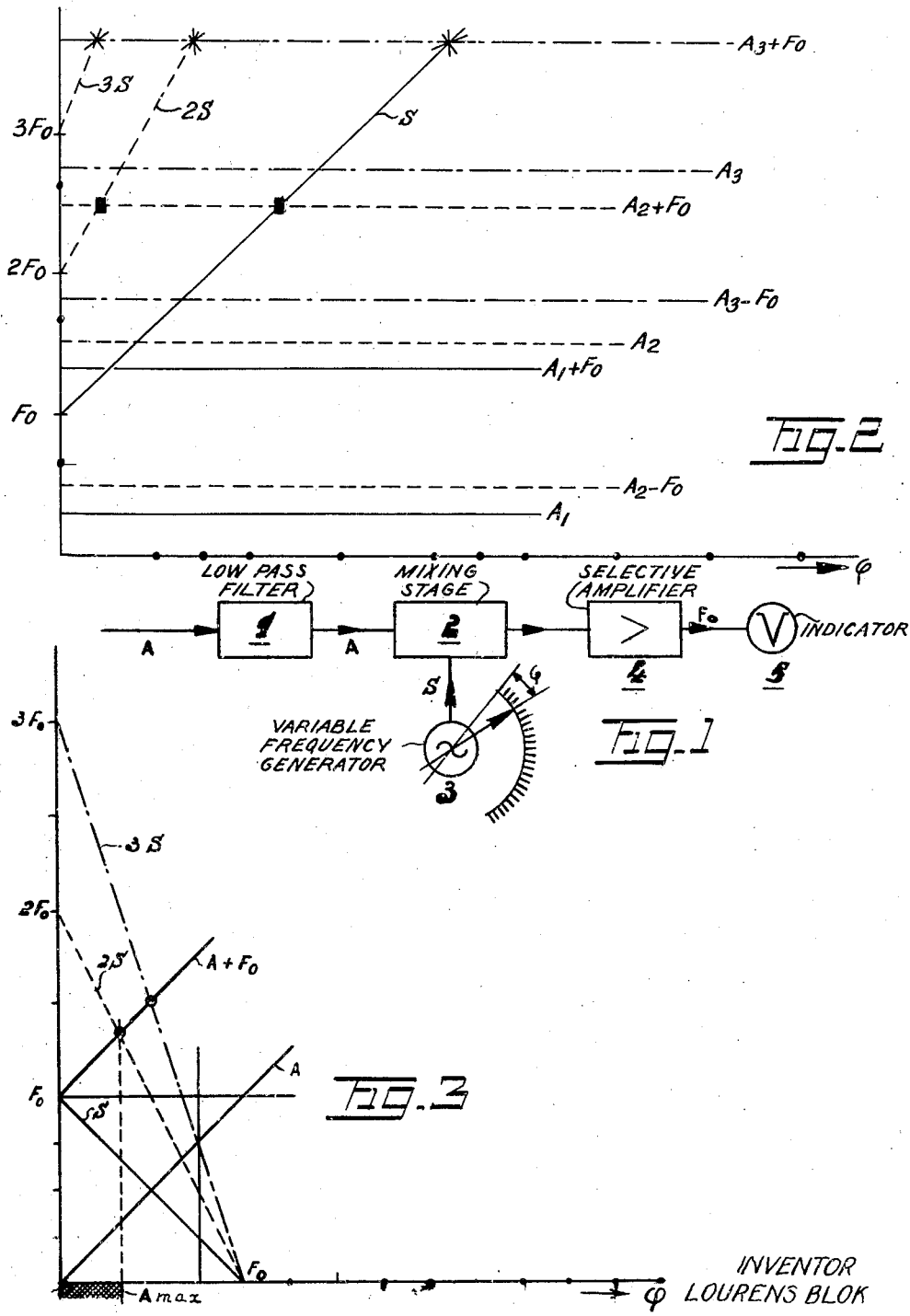
INVENTOR
LOURENS BLOK
BY Lee B. Kenon
ATTORNEY Patented Sept. 27, 1949

2,483,311

UNITED STATES PATENT OFFICE 2,483,311

FREQUENCY ANALYZER

Lourens Blok, Eindhoven, Netherlands, assignor to Hartford National Bank and Trust Company, Hartford, Conn., as trustee Application July 13, 1946, Serial No. 683,566
In the Netherlands May 3, 1943

Section 1, Public Law 690, August 8, 1946
Patent expires May 3, 1963

3 Claims. (Cl. 250—39)

This invention relates to a device for performing frequency analysis by methods utilizing a variable frequency signal.

In such devices, as is well known, the frequency spectrum to be examined and a variable frequency signal are supplied to a mixing stage whose output circuit is connected to a voltmeter responsive only to signals within a fixed tuned narrow frequency band.

Apart from any available measuring range changing-over arrangement, frequency analysers of this kind may be realized in two different ways. In one construction the response frequency of the voltmeter is lower than the minimum adjustable value of the variable frequency signal and the voltmeter gives an indication if the difference in frequency of the variable frequency signal and a component of the frequency spectrum to be examined corresponds with the response frequency of the voltmeter (difference frequency analysis).

In the other construction the response frequency of the voltmeter is higher than the maximum adjustable frequency of the variable frequency signal and the voltmeter gives an indication if the sum of the frequencies of the variable frequency signal and a component of the frequency spectrum to be examined corresponds with the response frequency of the voltmeter (sum frequency analysis).

Independently of the construction of frequency analysers of the foregoing type, it is found that the voltmeter often indicates frequency components which do not actually exist in the spectrum to be analyzed.

The invention is based on the realization that these measuring errors, which, of course, are very undesirable, are caused by combination frequencies of second or higher order harmonics of the variable frequency signal, which initiate in the mixing stage, and by components of the spectrum to be examined, whose frequency is different from the value corresponding to the adjusted signal frequency.

According to the invention these measuring errors can be reduced or, if desired, avoided by interposing a low-pass filter between the mixing stage of the frequency analyser and the source of the frequency spectrum to be examined.

The possible number of measuring errors becomes smaller as the limiting frequency of the input filter used according to the invention is chosen lower and ultimately all measuring errors are eliminated at a different limiting frequency. This holds in difference-frequency analysis if the limiting frequency of the low-pass filter corresponds with the response frequency of the voltmeter, but in sum-frequency analysis only if the limiting frequency is chosen smaller than one third of the response frequency of the voltmeter.

In order that the invention may be clearly understood and readily carried into effect it will now be described more fully with reference to the accompanying drawing, given by way of example.

Figure 1 is a block diagram of a frequency analyser according to the invention, Figures 2 and 3 showing graphs for explaining the said measuring errors in difference- and sum-frequency analysis respectively.

According to Figure 1 the frequency spectrum A to be examined is supplied through a low-pass filter 1 to a mixing stage 2 and mixed therein with the variable frequency signal S taken from a variable frequency generator 3. The output signal of the mixing stage, after having been amplified by means of a selective amplifier 4 tuned to the frequency $F_0$ controls a voltmeter 5.

In difference-frequency analysis the voltmeter 5 should give an indication only if the frequency spectrum A to be examined comprises a component $A_1$ having such a frequency that upon adjustment of a variable frequency signal having a frequency $S_1$ we have $$S_1 - A_1 = F_0$$

or $$S_1 = A_1 + F_0$$

It appears, however, that the voltmeter usually indicates more components of the spectrum than exist therein. These false indications are caused by the appearance of combination frequencies of a higher order of magnitude of a given signal S and by components available in the spectrum to be examined.

When making use of a push-pull modulator in the mixing stage, as is usual in devices of this kind, and if, moreover, the amplitude of the variable frequency signal is large with respect to the maximum available amplitude of the frequency components in the spectrum to be examined, then, if $n$ be an arbitrary positive and whole number, practically only the combination frequencies of the forms $$nS - A = F_0 \quad (2a)$$

and $$A - nS = F_0 \quad (2b)$$

may give trouble according as to whether $nS > A$ or $A > nS$.

The occurrence of the correct and the false indications appears in a simple manner from the graph shown in Figure 2. In this graph the frequency is plotted as an ordinate, whereas the reading $\varphi$ on the dial of the variable frequency generator 3 is represented by the abscissa. The graph illustrates the variation of the variable frequency signal S and higher harmonics thereof as a function of the reading $\varphi$, hence $$nS = f(\varphi),$$

where $n = 1, 2$ and 3. When supplying to the mixing stage 2 a component of the spectrum to be examined having a frequency $A_1$ it be found from Figure 2 at what values of $\varphi$ an indication of the voltmeter is obtained, i. e. according to (1) at those values at which the lines $S = f(\varphi)$ and $(A_1 + F_0) = k$ (a constant) intersect each other (point of intersection indicated by an open circle).

In the case under view it has been tacitly assumed that the frequency $A_1$ is smaller than the tuning frequency $F_0$ of the voltmeter, but this usually will not be the case. If the frequency of a component of the spectrum to be examined amounts to $A_2$ and $F_0 < A_2 < 2F_0$ an indication is obtained with different readings $\varphi$ of the dial of the variable frequency generator.

The different readings ($\varphi$) can be found by means of Figure 2 by drawing again a line $(A_2 + F_0) = $ constant parallel with the abscissa and by determining the points of intersection with the lines S and 2S. The reading corresponding with the point of intersection between S and $(A_2 + F_0)$ is correct, since for this point of intersection the relation (1) holds viz:

$$S_2 - A_2 = F_0$$

However, the reading corresponding with the point of intersection between 2S and $(A_2 + F_0)$ is false. In regard to this point of intersection we have:

$$2S'_2 = A_2 + F_0 \text{ or } 2S'_2 - A_2 = F_0$$

As appears from (2) and (3) this incorrect reading is caused by a combination frequency of higher order of magnitude of the variable frequency signal S, which is initiated in the mixing stage, and a spectrum component whose frequency lies between $F_0$ and $2F_0$.

If the spectrum to be examined comprises a component having a frequency $A_3$, for which holds:

$$2F_0 < A_3 < 3F_0$$

a single correct value and a plurality of incorrect values of $\varphi$ arise, at which the voltmeter gives an indication.

These are found by determining the points of intersection between the lines $(A_3 + F_0)$ and $(A_3 - F_0)$ with the lines S, 2S and 3S.

In regard to these points of intersection we have successively:

$$A_3 + F_0 = S_3 \text{ or } S_3 - A_3 = F_0; \text{ correct}$$
$$A_3 + F_0 = 2S'_3 \text{ or } 2S'_3 - A_3 = F_0; \text{ incorrect}$$
$$A_3 + F_0 = 3S''_3 \text{ or } 3S''_3 - A_3 = F_0; \text{ incorrect}$$
$$A_3 - F_0 = S'''_3 \text{ or } A_3 - S'''_3 = F_0; \text{ incorrect}$$

Similarly, if $$3F_0 < A_4 < 4F_0$$

one correct and five incorrect values of $\varphi$ are found in regard to a component $A_4'$ and if $$4F_0 < A_5 < 5F_0$$

one correct and seven incorrect values of $\varphi$ are found and so on.

From the foregoing it appears at the same time that the possible number of false measurements decreases as the limiting frequency of the input filter used, according to the invention, before the mixing stage, is lower, false measurements being entirely avoided if the input filter does not transmit frequencies exceeding $F_0$. It is pointed out that this expedient involves by no means a restriction of the field of application of a frequency analyser of this kind. By a suitable choice of the frequency $F_0$ a sufficient range of the analyser is ensured.

The conditions in sum-frequency analysis may be considered similarly to those in difference frequency analysis and will be more fully explained by reference to Figure 3.

In this case the voltmeter should give an indication only if $$S_1 + A_1 = F_0$$

trouble being then experienced from combination frequencies of the form $$nS - A = F_0$$

In order to trace the influence of these disturbing combination frequencies it is indicated in Figure 3 that $$nS = f_1(\varphi)$$

and $$A = f_2(\varphi)$$

Taking into account that the Equation 5 may run as follows:

$$nS = A + F_0 \quad (5a)$$

it is also recorded that $$A + F_0 = f_3(\varphi)$$

The points of intersection of the lines $nS$ and $(A + F_0)$ indicate those values of $\varphi$ at which the voltmeter will give indications again as a result of combination frequencies of a higher order of magnitude initiated in the mixing stage.

At the same time it can be deduced from Figure 3 that, for instance, the point of intersection of $(A + F_0)$ and $3S$ can be avoided; to this end care should be taken that $$3S - A_{\max} < F_0$$

Since, according to Equation 4

$$3S + 3A_{\max} = 3F_0$$

it follows by a subtraction of these equations and division by 2 that $$A_{\max} < \tfrac{1}{2} F_0$$

Consequently, when avoiding by means of a low-pass input band-pass filter that the spectrum supplied to the mixing stage comprises components having a frequency higher than $\tfrac{1}{2} F_0$ the initiation of the combination frequency $$3S - A = F_0$$

is avoided with certainty.

Similarly the occurrence of false indications due to the combination frequency $$2S - A = F_0$$

can be avoided by making the limiting frequency of the input band-pass filter = $\frac{1}{3}F_0$.

Also in this case, consequently, the possible number or false indications is smaller as the limiting frequency of the input filter used according to the invention is chosen smaller, and by a suitable choice of the limiting frequency the occurrence of false indications can be entirely avoided again. Also in this case the use of the input filter does not mean a restriction of the field of application of the analyser, since by a suitable choice of the tuning frequency of the selective voltmeter amplifier a sufficient frequency-range can be covered again.

What I claim is:

1. A circuit arrangement for determining the frequency components of voltages of unknown frequency, comprising a low-pass filter, a calibrated variable frequency oscillator, a mixing stage coupled to said low-pass filter and said variable frequency oscillator, a selective amplifier with fixed tuning coupled to said mixing stage, an indicator coupled to said selected amplifier, and means to apply said voltages of unknown frequency to said low-pass filter.

2. A circuit arrangement for determining the frequency components of voltages of unknown frequency, comprising a low-pass filter, a calibrated oscillator variable over a predetermined frequency range, a mixing stage coupled to said low-pass filter and said variable frequency oscillator, a selective amplifier coupled to said mixing stage and tuned to a frequency substantially equal to the cut-off frequency of said low-pass filter and lower than the minimum frequency of said variable frequency oscillator, an indicator coupled to said selected amplifier, and means to apply said voltages of unknown frequency to said low-pass filter.

3. A circuit arrangement for determining the frequency components of voltages of unknown frequency, comprising a low-pass filter, a calibrated oscillator variable over a predetermined frequency range, a mixing stage coupled to said low-pass filter and said variable frequency oscillator, a selective amplifier coupled to said mixing stage and tuned to a frequency substantially three times the cut-off frequency of said low-pass filter and higher than the maximum frequency of said variable frequency oscillator, an indicator coupled to said selected amplifier, and means to apply said voltages of unknown frequency to said low-pass filter.

LOURENS BLOK.

No references cited.

Certificate of Correction

Patent No. 2,483,311 September 27, 1949

LOURENS BLOK

It is hereby certified that errors appear in the printed specification of the above numbered patent requiring correction as follows:

Column 6, line 28, strike out the words and period "No references cited." and insert instead the following—

REFERENCES CITED

*The following references are of record in the file of this patent:*

UNITED STATES PATENTS

| Number | Name | Date |
|---|---|---|
| 2,393,717 | Speaker | Jan. 29, 1946 |
| 2,407,213 | Tunick | Sept. 3, 1946 | and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*